(12) United States Patent
Koizumi

(10) Patent No.: US 6,299,087 B1
(45) Date of Patent: Oct. 9, 2001

(54) DATA CARTRIDGE HAVING A REDUCED STATIC CHARGE

(75) Inventor: Osamu Koizumi, Miyagi (JP)

(73) Assignee: Sony Corporation, Tokyo (JP)

( * ) Notice: Subject to any disclaimer, the term of this patent is extended or adjusted under 35 U.S.C. 154(b) by 204 days.

(21) Appl. No.: 08/912,585

(22) Filed: Aug. 18, 1997

(30) Foreign Application Priority Data

Aug. 21, 1996 (JP) ................................. 8-237358

(51) Int. Cl.[7] ...................................... G11B 23/04
(52) U.S. Cl. ................ 242/347; 242/342; 242/346; 242/906; 360/132
(58) Field of Search ........................ 242/342, 347, 242/906, 346; 360/132

(56) References Cited

U.S. PATENT DOCUMENTS 4,570,197 * 2/1986 Hakanson et al. ............... 242/341 X
5,322,585 * 6/1994 Stanley et al. ................... 242/346 X

* cited by examiner

*Primary Examiner*—John Q. Nguyen
(74) *Attorney, Agent, or Firm*—Ronald P. Kananen; Rader, Fishman & Grauer

(57) ABSTRACT

The surface of the base plate of the data cartridge is treated with chromate so as to coat the surface with a conductive film, with which the grounding means such as the elastic arms and cartridge positioning rollers provided on the chassis of the data cartridge drive come in contact when the data cartridge is loaded in a data cartridge drive.

4 Claims, 16 Drawing Sheets

DATA CARTRIDGE HAVING A REDUCED STATIC CHARGE

BACKGROUND OF THE INVENTION

This invention relates to a data cartridge appropriately usable as, for example, an external storage for backing up a hard disk used as a storage for a computer (CPU), and a data cartridge drive used for driving the data cartridge.

A data cartridge and a data cartridge drive for driving the loaded data cartridge have been used conventionally to back up a hard disk used as a storage of a computer. The data cartridge is formed like a flat box provided with a synthetic resin molded top cover attached on an aluminum base plate. Inside the cartridge, a magnetic tape is loaded with the magnetic tape being wound on and between a pair of tape reels (right and left). The data cartridge is further provided with a tape feeding mechanism comprising a driving roller, a pair of corner rollers (right and left), a driving belt for driving the magnetic tape wound on and fed among those three rollers, as well as other associated mechanisms.

On the other hand, inside the data cartridge drive is provided a driving mechanism comprising a magnetic head, a spindle motor, a capstan roller etc. When a data cartridge is loaded in the data cartridge drive, the magnetic tape comes in contact with the magnetic head, the capstan roller is pressed against the driving roller, and the motor drives the capstan roller to rotate, thereby rotating the driving roller so that the driving belt feeds the magnetic tape and the data is recorded on or reproduced from the magnetic tape by means of the magnetic head.

An aluminum base plate is used for such a data cartridge because of its excellent properties such as easiness to machine, light weight, and sufficient rigidity. However, aluminum is liable to suffer corrosion and corrosion of the aluminum has to be prevented by, for example, coating the surface of the base plate with an anodic oxide protection film as disclosed in Unexamined Published Japanese Patent Application No. 8-7969. In this disclosed patent, after the base plate material is machined into a flat plate, the surface of the flat plate is coated with an anodic oxide protection film and the external shape, holes, notches, etc. of the flat plate are punched (e.g., die-punching) so as to improve the accuracy of vertically fixing parts such as tape guide pins, on the base plate by press-fitting.

FIG. 1 shows a related art base plate 3 machined as explained in Unexamined Published Japanese Patent Application No. 8-7969. Either surface of the aluminum base plate 3 is coated with an anodic oxide protection film 300. This anodic oxide protection film 300 is a non-conductive film. After this protection film 300 is coated on the surfaces of the base plate 3, the external shape of the base plate is die-punched, so that only the external periphery end face 3c of the base plate, the inside end faces 3d of a pair of right and left positioning notches 31, and the inside end faces of other holes and notches that are die-punched become conductive portions of the base plate 3. The base plate 3 shown in FIG. 1 has been die-punched from below to upward, which causes shear drops 300a of the protection films 300 wrapping around the lower edges of the outer periphery end face 3c, the inside end face 3d of the notch 31, etc.

FIG. 1 also shows how to position a data cartridge loaded in the data cartridge drive. The positioning roller 84 is pressed against the lower edge 31a of the positioning notch 31 of the base plate 3 in the direction of arrow mark F (upper oblique portion) to lift the base plate 3 from the chassis 61 in the direction of arrow mark F, then the front end 3b of the base plate 3 is pressed against the vertical reference plane 79a of the cartridge loading guide 79 and the back-and-forth direction reference plane 83a of the cartridge loading stopper 83 in both directions of arrow marks F1 and F2 to position the data cartridge.

Data cartridges and data cartridge drives of this type employing the related art have had problems of accumulation of static electricity generated among the driving roller, corner rollers, driving belt, magnetic tape, etc. in the data cartridge while recording data on or regenerating data from the magnetic tape. The accumulated static electricity discharges to sometimes cause data write errors, data damages, etc. and various countermeasures have been taken to solve those problems. In other words, the accumulated static electricity is not easily eliminated since, as shown in FIG. 1, both upper and lower surfaces of the base plate 3 are coated with a non-conductive film such as a protection film 300 and only the outer periphery end face 3c, the inside end face 3d of the notch 31, etc. that are die-punched are conductive portions of the base plate 3, and the shear drop 300a of the non-conductive protection film 300 wrapping around the lower edge 31a prevents stable electrical contact of the base plate 3 to the grounded chassis 61 via the positioning roller 84 even if the roller 84 is pressed against the lower edge 31a of the notch 31 in the direction of arrow mark F for the purpose of grounding the base plate 3. In the related art, therefore, there has been no way other than using a shielding plate of the spindle motor or a circuit for shielding the base plate 3 and using such a shielding plate has expanded the size to cause increased weight and manufacturing cost of the devices.

Under such circumstances, it is an object of the present invention to provide a data cartridge and a data cartridge drive that prevent static electricity from being accumulated in the data cartridge.

SUMMARY OF THE INVENTION

To achieve the above object, the present invention provides a data cartridge having a base plate whose both surfaces are coated with a conductive film for preventing the base plate from corrosion and a data cartridge drive having a grounding means to come in contact with the surface of the base plate when the data cartridge is loaded in the data cartridge drive.

The conductive film coated on the base plate of the data cartridge according to the invention can prevent corrosion of the base plate and enables grounding at any point on the surfaces of the base plate.

Furthermore, the data cartridge drive according to the invention can make the base plate to be grounded to the chassis very easily and surely by contacting the grounding means on the surface of the base plate when a data cartridge is loaded in the drive.

BRIEF DESCRIPTION OF THE DRAWINGS

FIG. 2a is a cross-section view of the base plate taken along line A—A in FIG. 2.

DETAILED DESCRIPTION OF THE PREFERRED EMBODIMENTS

Subsequently, some embodiments of a large capacity data cartridge and a data cartridge drive used for the data cartridge, to which the present invention is applied, will be described with reference to FIG. 2 through FIG. 16.

Figure 14:
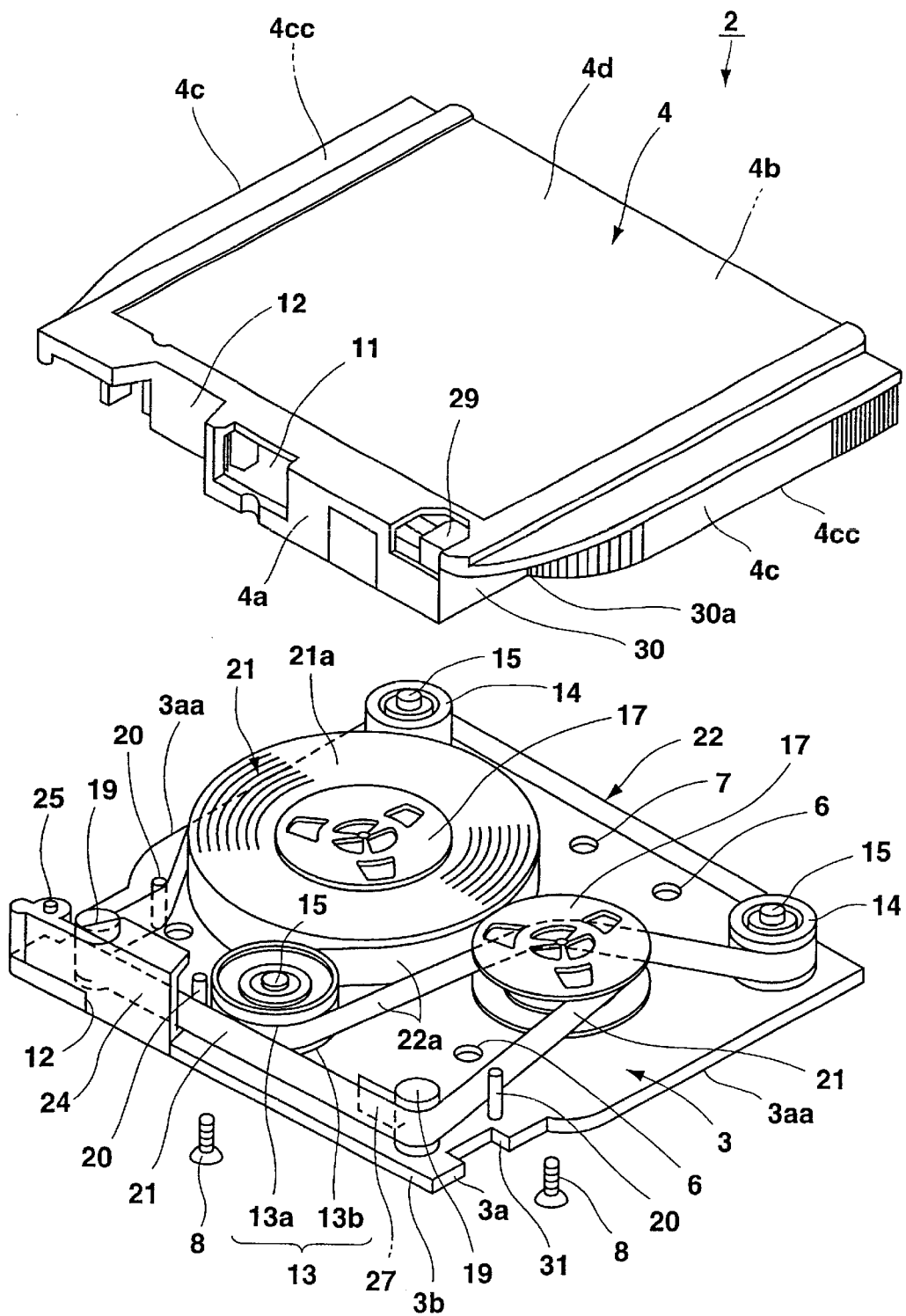
FIG. 14 is a partially exploded perspective view showing a data cartridge.
Figure 15:
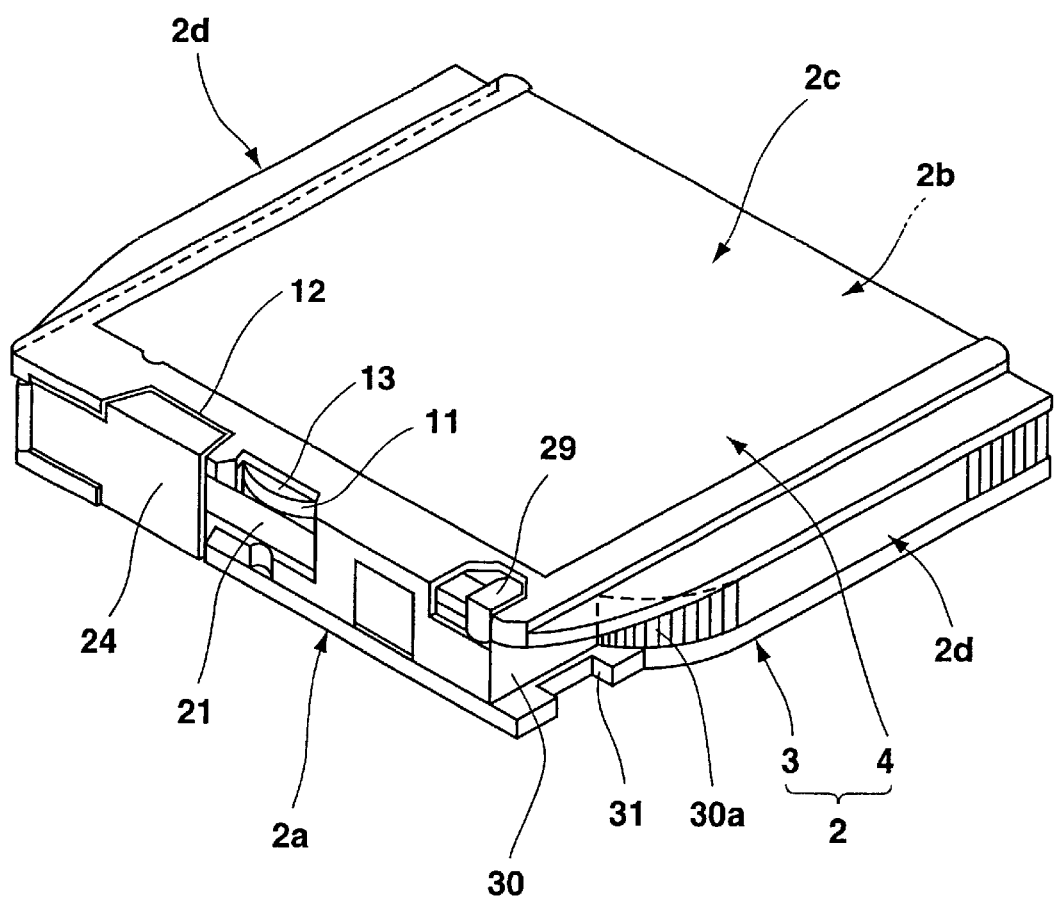
FIG. 15 is a perspective view of the data cartridge shown in FIG. 14 as a completed product.

At first, the tape feeding mechanism and other mechanisms of the large capacity data cartridge 1 will be explained with reference to FIG. 2, and FIG. 14 through FIG. 16. As shown in FIGS. 14 and 15, the cartridge 2 of this data cartridge 1 is formed like a flat box provided with a base plate 3 comprising an aluminum flat plate and a top cover 4 formed with light transmitting synthetic resin.

As shown in FIG. 14, the top cover 4 comprises a front wall 4a, a rear wall 4b, right and left walls 4c, and a top wall 4d that are one-piece molded. The bottom of the top cover 4 is open. At the back surface of the top wall 4d, there are provided 4 pairs of one-piece molded engaging claws 5 (FIG. 16), eight in total, at four positions near the four corners of the top cover with claws at their lower ends. There are also provided two one-piece molded screw fixing bosses 9 on the back surface of the top wall 4d. On the base plate 3, there are provided four stop holes 6 near the four corners, and two screw holes 7 respectively formed at two places near the front and rear ends around the center in the right and left direction. To fix the top cover 4 on the base plate 3, each pair of the engaging claws 5 is engaged in each stop hole 6 and two screws 8 are respectively inserted from bottom to top and tightened in the two down-facing screw fixing bosses 9 formed on the top wall 4d.

A capstan roller recess 11 is opened almost in the center of the right-left direction of the front wall 4a of this cartridge 2, and at the left side of this capstan roller recess 11 is opened a magnetic head recess 12. In this cartridge 2 are arranged a driving roller 13 inside the capstan roller recess 11 and a pair of right and left corner roller 14 at a pair of right and left corners formed by the rear wall 4b and, right and left side walls 4c. The driving roller 13 and the pair of right and left corner roller 14 are formed with synthetic resin and rotatably attached at the outer periphery of the three metallic shafts 15 press-fitted on the base plate 3.

The driving roller 13 comprises a large diameter roller 13a and a small diameter roller 13b that are one-piece molded to form two steps (upper and lower). Part of the large diameter roller 13a is exposed in the upper portion in the capstan roller recess 11 provided on the front wall 4a. Inside this cartridge 2 is arranged a pair of right and left tape reels 17, each of which is provided with upper and lower flanges, almost on the center line between the front and rear. Those tape reels 17 are formed with synthetic resin, and rotatably attached to the outer periphery of the two metallic shafts press-fitted on the base plate 3.

Inside this cartridge 2 are also arranged a pair of right and left tape guides 19, each of which is provided with upper and lower flanges, near the pair of right and left corners on the front end side, and three pin-like tape guides 20 provided with no flange, one between the capstan roller recess 11 and the magnetic head recess 12, and two on both right and left sides. Those tape guides 19 and 20 are made of metal and press-fitted on the base plate 3. At the outer periphery of each of the pair of right and left tape reels 17 is wound one end of the magnetic tape 21. This magnetic tape 21 is guided by those tape guides 19 and 20, five in total, and passes through inside both the capstan roller recess 11 and the magnetic head recess 12 along the inner part of the front wall 4a.

The driving belt 22 having an elasticity provided by a rubber belt, etc. is applied between the small diameter roller 13b of the driving roller 13 and the pair of right and left corner roller 14 almost in a T-shape with a strong pre-tension. A pair of right and left tape drivers 22a provided between the driving roller 13 of this driving belt 22 and the pair of right and left corner roller 14 are in pressure-contact with the outer periphery of the wound part 21a of the magnetic tape 21 wound at the outer periphery of the pair of right and left tape reels 17.

The magnetic head recess 12 is formed almost like a trapezoid so as to be bridged from the base plate 3 to the top wall 4d of the top cover 4. The magnetic tape 21 is horizontally fed going across inside this magnetic head recess 12. Across the magnetic tape 21 vertically, an opening and closing lid 24 a part of which is formed to have U-shaped cross section is attached on the metallic shaft 25 press-fitted on the base plate 3 so as to be rotated freely in both directions of arrow marks a and b, so that the magnetic head recess 12 can be opened and closed. This lid 24 is rotated forcibly by a coil spring (not illustrated) inserted in the outer periphery of the shaft 25 in the direction of arrow mark b (direction to close).

Inside the cartridge 2, a mirror 27 used for detecting light from the tape end is arranged on the right side of the driving roller 13. This mirror 27 comprises light transmitting synthetic resin, fitted on the base plate 3 and held by the top cover 4 so as to cover the light transmission hole 28 formed on the base plate 3. At the right front end of the top wall 4d of the top cover 4 is attached a sliding safety lug 29. A pair of right and left short wide grooves 30 are respectively formed in parallel on the right and left side walls 4c near the front end 2a of the top cover 4 of the cartridge 2. In these wide grooves 30, a pair of right and left square positioning notches 31 are respectively formed at the right and left ends 3a of the base plate 3.

Figure 16:
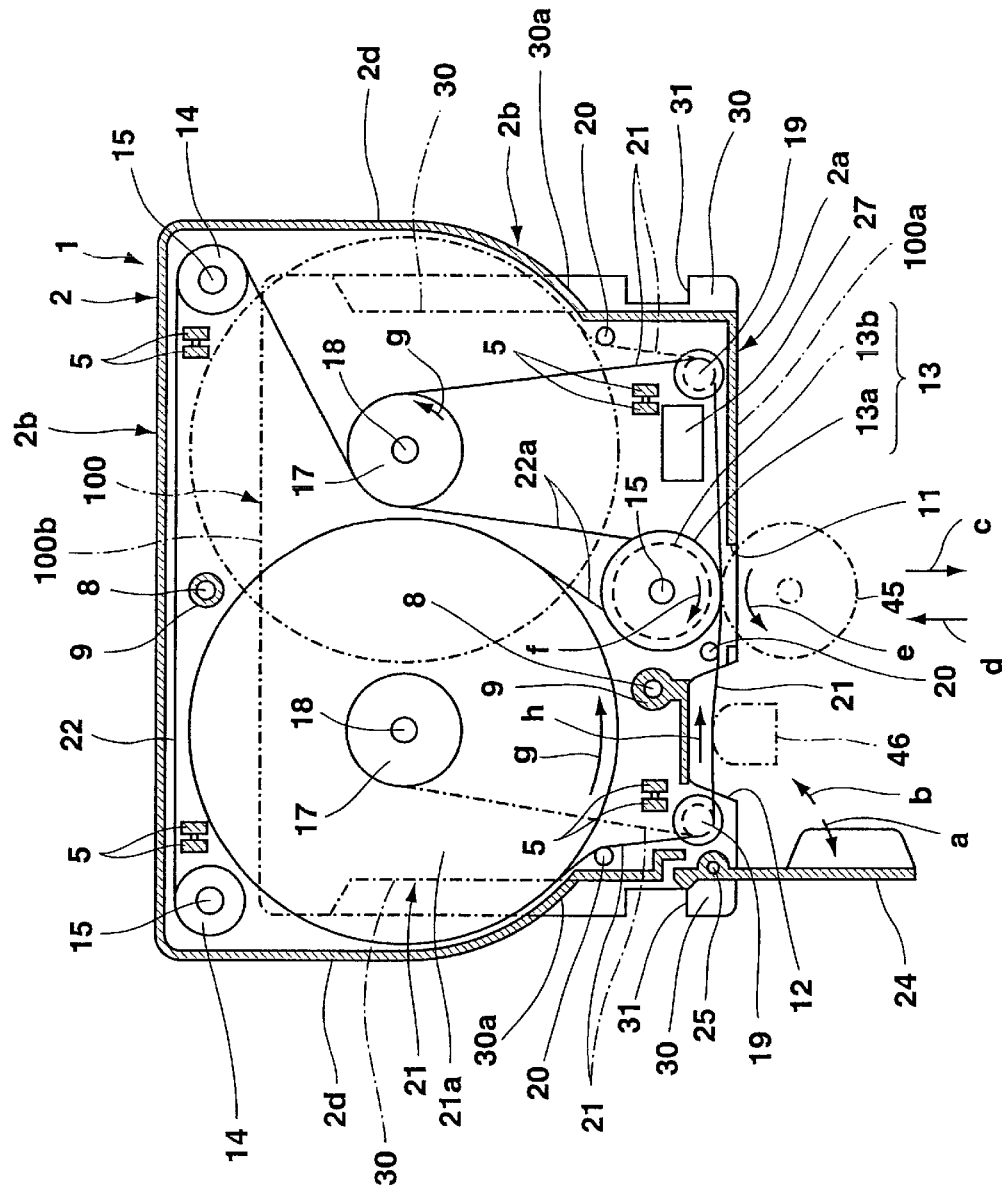
FIG. 16 is a partial cutaway top view of the data cartridge shown in FIG. 14.

In FIG. 16, a square-shaped standard data cartridge 100 is shown with an alternate long and short dash line with which a large capacity data cartridge 1 is compared in size and shape. In this large capacity data cartridge 1, a pair of right and left swelling portions 2d on both right and left sides 3aa of the base plate 3 and on both right and left sides 4cc of the top cover are respectively formed symmetrically from the rear end 30a of the pair of right and left wide grooves 30 to the rear of the cartridge 2, and the width in the right-left direction and the depth in the back-and-forth direction are extended in the portion from the rear end of the wide grooves 30 of the cartridge 2. Thus, the maximum diameter of the wound magnetic tape 21 wound on the pair of right and left tape reels 17 is extended more than that of the standard data cartridge 100 to significantly increase the recording capacity with the width in the right-left direction of the front end 2a of the data cartridge 1 being kept to be the same as the width of the square-shaped standard data cartridge 100 whose front and rear ends 100a and 100b have the same widths in the right-left direction. Consequently, the length of the pair of right and left wide grooves 30 in the back-and-forth direction is long in the standard data cartridge 100 and is short in the large capacity data cartridge 1.

Figure 1:
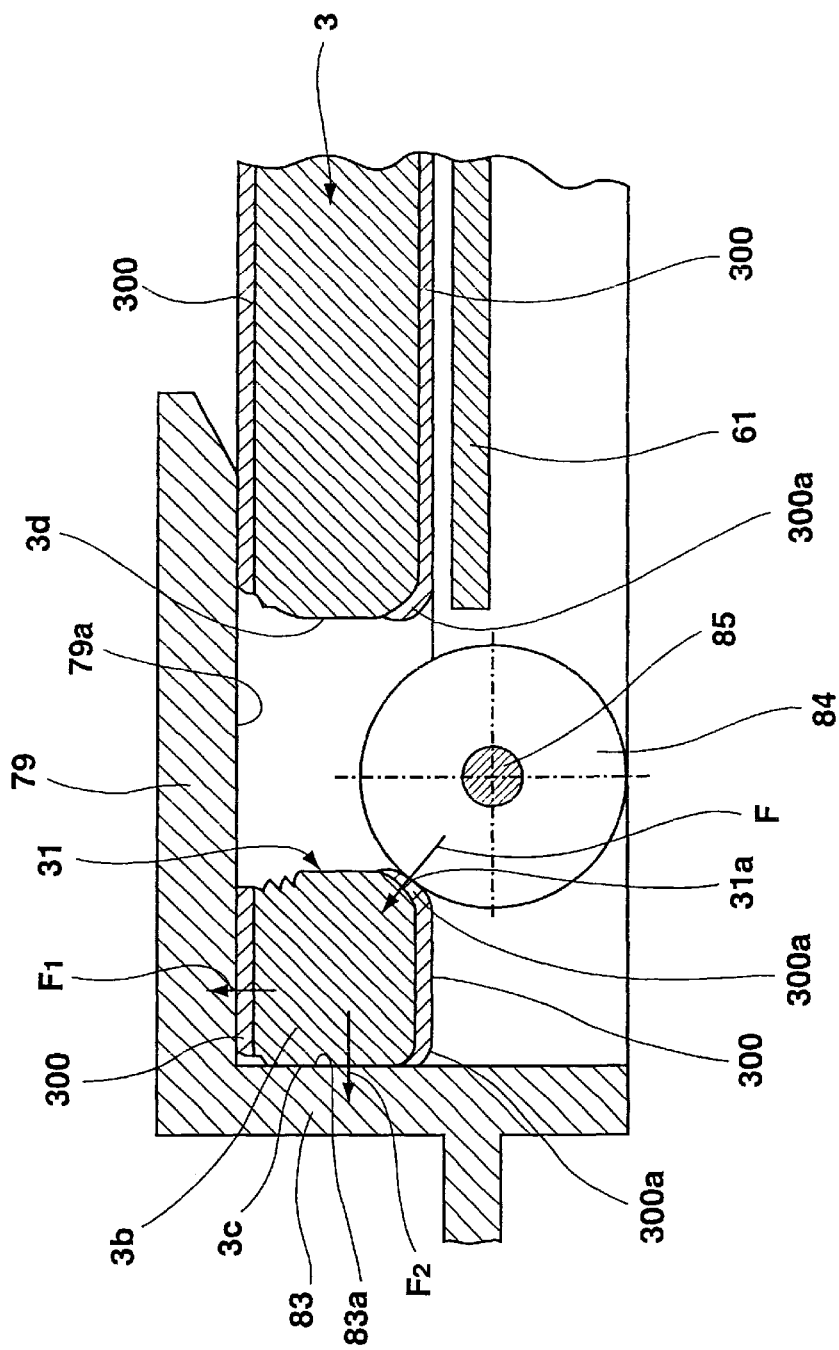
FIG. 1 is a sectional side view explaining the base plate of the related art data cartridge.
Figure 2:
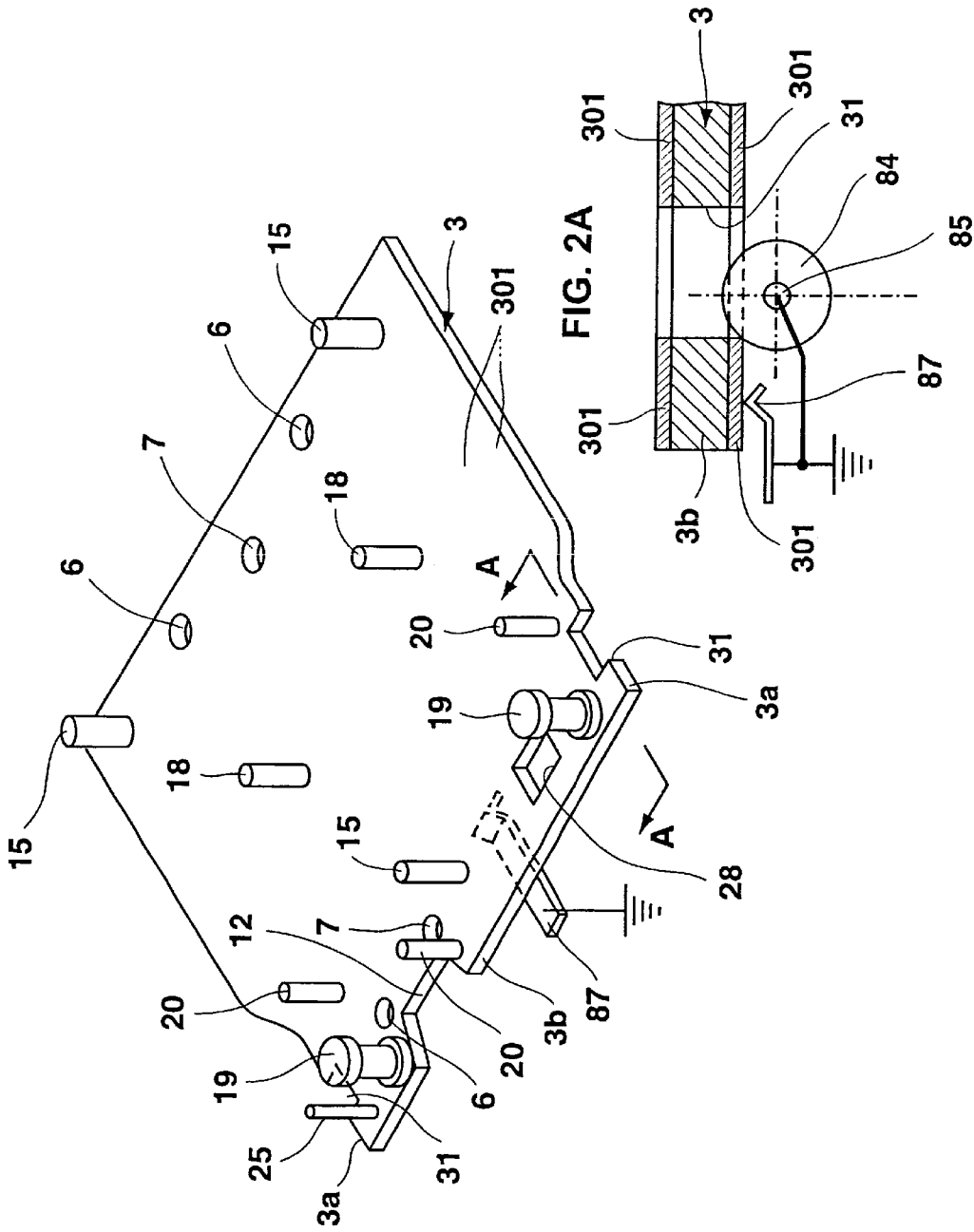
FIG. 2 is a perspective view showing a base plate of a data cartridge in an embodiment according to the present invention.
Figure 3:
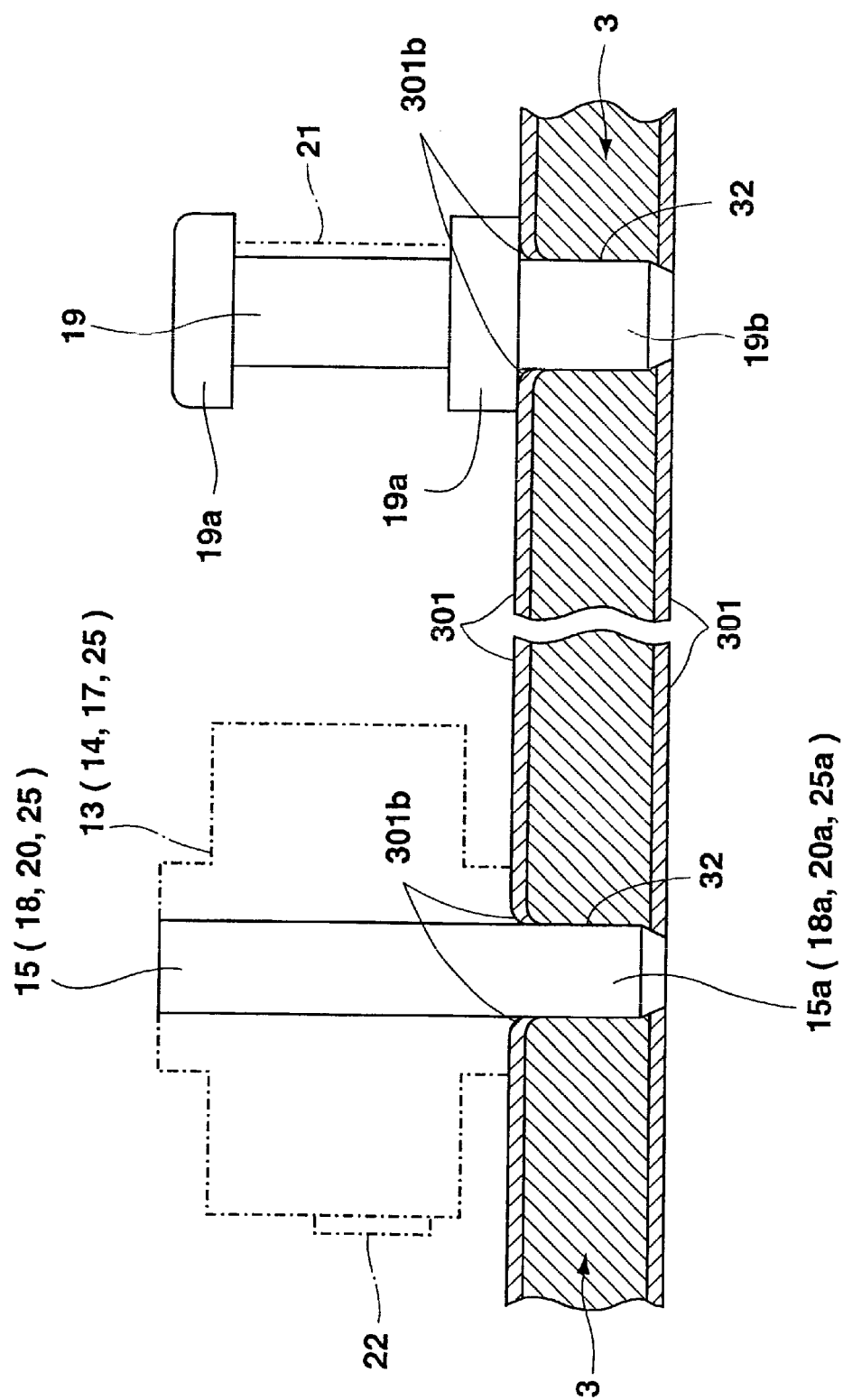
FIG. 3 is a sectional side view explaining the electrical conduction between the conductive film coated on the above base plate, the shafts and the tape guides.

Subsequently, the conductive film 301 of the base plate will be explained with reference to FIG. 2 through FIG. 4. In order to prevent the base plate 3 comprising aluminum from corrosion, the surface of the base plate 3 is chromate treated to be coated with a conductive film 301.

At this time, the first method for providing the base plate 3 coated with the conductive film 301 is carried out as follows. At first, the base plate material is machined into a flat plate, then the external shape, holes prepared holes 32 for (press-fitting shafts 15, 18, 25 and tape guides 19, 20, and light transmission hole 28), and notches (magnetic head recess 12 and notch 31) for positioning are provided by punching the machined base plate with a so-called die-punching to make the base plate 3. Finally, all the surfaces of both face and back, outer periphery, holes, and notches of the base plate 3 are chromate treated to be coated with a conductive film 301.

The second method is carried out as follows. At first, the base plate material is machined into a flat plate, then the surface of the flat base plate is chromate treated, so that the surface of the base plate is coated with a conductive film 301. And finally, the base plate coated with a conductive film 301 is punched with a so-called die-punching so that its external shape, holes, notches, etc. are formed for making the base plate 3.

In the present invention, both of the first and second methods can be employed. By the second method, however, the fixing accuracy including verticality in press-fitting a plurality of the shafts 15, 18, 25 and the tape guides 19, 20 on the base plate 3 can be improved more significantly than by the first method. FIG. 3 and FIG. 4 show the base plate 3 provided by this second method. In the base plate 3 provided by the first method, the conductive films 301 coated on the face and back surfaces are connected directly to each other via the base plate and its outer periphery, and the inner periphery of the holes, notches, etc. In the base plate 3 provided by the second method, the conductive films 301 coated on the face and back surfaces are connected indirectly to each other via the base plate 3.

Subsequently, the electrical conduction between shafts 15, 18, and 25 or tape guides 19 and 20 press-fitted on the base plate 3 and the conductive film 301 coated on the surfaces of the base plate 3 will be explained with reference to FIG. 2 and FIG. 3. The base plate 3 has already die-punched prepared holes in which shafts 15, 18, and 25, as well as tape guides 19 and 20 are press-fitted. The shafts 15, 18, and 25 and the pin-like tape guide 20 are fixed with their lower ends 15a, 18a, 25a, and 20a being press-fitted into those prepared holes directly by hammering them from above. The tape guide 19 integrally formed together with the upper and lower flanges 19a is fixed with its integrally formed coaxial press-fitting pin 19b at its lower end being press-fitted into the prepared hole 32 by hammering it from above.

In this press-fitting, the face side conductive film 301 of the base plate 3 around the shear drops 301a of a plurality of the prepared holes 32 are pulled into the prepared holes 32 with those shafts 15, 18, and 25, as well as the tape guides 19 and 20, so that they are electrically connected to the conductive film 301 on the face of the base plate 3. Furthermore, when the lower ends 15a, 18a, 25a, 19b and 20a of those shafts 15, 18, 20, 25, as well as the tape guides 19 and 20 are press-fitted to reach the conductive film 301 on the back surface of the base plate 3, they are also electrically connected to the conductive film 301 on the back surface of the base plate 3. For the tape guide 19 provided with upper and lower flanges 19a, the lower flange 19a is press-fitted to a position where the lower flange 19a comes in contact with the conductive film 301 on the face of the base plate 3, so that the lower flange 19a can also be connected to the conductive film 301 electrically.

Subsequently, the magnetic tape driving mechanism and other parts of the data cartridge drive 41 will be explained with reference to FIG. 4 through FIG. 13. The data cartridge drive 41 usable for a 3.5-inch form factor, which is a magnetic recording/reproducing apparatus used for a computer (CPU) as an external storage for backing up a hard disk, is structured so as to be used commonly to the above mentioned large capacity data cartridge 1 and the standard data cartridge 100. The front panel 42 of this data cartridge drive 41 is provided with a horizontally elongated rectangular cartridge loading slit 43. Inside the data cartridge drive 41 are provided a capstan roller 45 comprising a rubber roller rotated by a spindle 44a of a spindle motor 44; a magnetic head 46; a loading guide for the base plate 3 of the data cartridge 1; a positioning means; and an opening means for opening a lid 24, etc. This data cartridge drive 41 is designed so as to be used commonly for both the large capacity data cartridge 1 and the standard data cartridge 100, so that the selected data cartridge 1 or 100 can be loaded horizontally from the cartridge loading slit 43 in the direction of arrow mark c.

Figure 5:
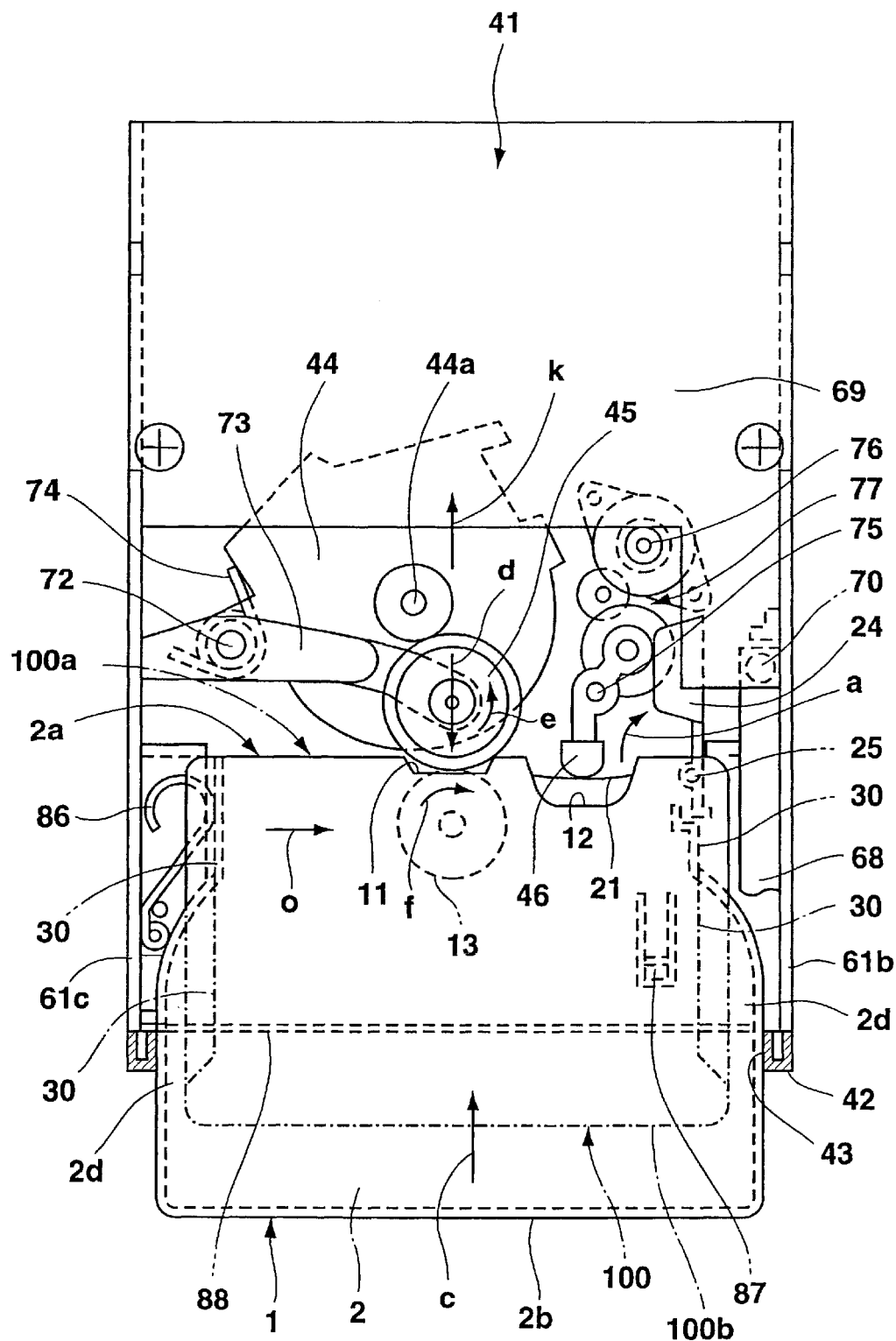
FIG. 5 is a partial cutaway top view showing how a data cartridge is loaded in a data cartridge drive.
Figure 6:
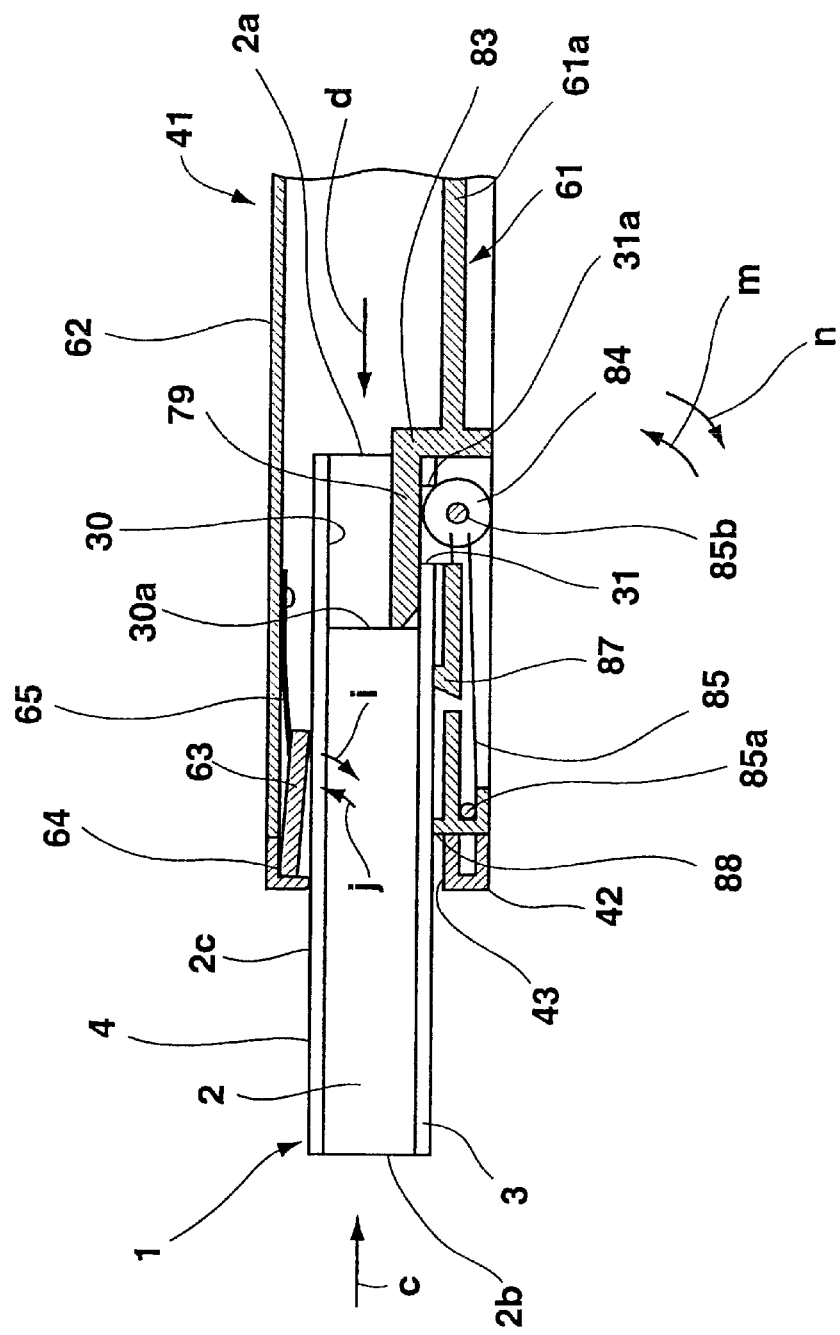
FIG. 6 is a sectional side view of the main portion of the data cartridge and the data cartridge drive shown in FIG. 5.

As shown in FIG. 5 and FIG. 6, when the data cartridge 1 is loaded from its front end 2a into the cartridge loading slit 43 of the data cartridge drive 41 in the direction of arrow mark c, the lid 24 is opened around the shaft 25 in the direction of arrow mark a against the force of the coil spring, and the capstan roller 45 and the magnetic head 46 are inserted relatively into the capstan roller recess 11 and the magnetic head recess 12 in the direction of the arrow mark d. Then, as shown by an alternate long and short dash line in FIG. 16, the capstan roller 45 is pressed against the large diameter roller 13a of the driving roller 13 by a spring to be described later in the direction of arrow mark d, with the magnetic head 46 coming in contact with the magnetic tape 21 between the tape guides 19 and 20 in the direction of arrow mark d.

The spindle motor 44 drives the capstan roller 45 to rotate in the direction of arrow mark e, and the capstan roller 45 rotates the driving roller 13 in the direction of arrow mark f, so that the large diameter roller 13a rotates in the direction of the arrow mark g to drive the driving belt 22. Then, a pair of right and left tape drivers 22a of the driving belt 22 drives a pair of right and left tape reels 17 in the direction of arrow mark g via a pair of the right and left wound part 21a by a friction. Then, the magnetic tape 21 is fed in the direction of arrow mark h between a pair of right and left tape guides 19 so that it is wound up onto the right tape reel 17 from the left tape reel 17. Thus, the magnetic head 46 can record/reproduce data of the computer (CPU) on/from the magnetic tape 21.

This data cartridge drive 41 is formed like a thin rectangular box, comprising a metallic chassis 61 formed with metallic plate, etc. so that it has a U-shaped cross section with its top side opened and top cover 62 formed to have a U-shaped cross section with its lower side opened so that it is removably fitted to the chassis 61 from above. On the front side of the box-like data cartridge drive 41 is removably fitted a horizontally rectangular front panel 42 molded with synthetic resin. Furthermore, inner side the front panel 42, a lid 63 for opening and closing the horizontal cartridge loading slit 43 from inside is provided rotatably in the directions of arrow mark i and j. This lid 63 is molded with synthetic resin, in a horizontally rectangular shape and has a pair of integrally molded horizontal shafts 64 at both right and left ends of the upper edge. The shafts 64 are rotatably attached to inside the front panel 42 at a position around the right and left ends on the upper side edge of the front panel 42. The lid 63 is rotatably forced by a coil spring (not illustrated) inserted and attached at the outer periphery of one of the shafts in the direction of arrow mark i, in which the lid is closed. The plate spring 65 attached on the under surface of the top cover 62 is arranged at an upper position of the rotation locus of the lid 63.

A light-emitting indicator 67 (FIG. 12) is provided in the upper portion at one end of the front panel 42 in the right-left direction. This light-emitting indicator 67 forms a so-called operation lamp indicating each operations as recording and reproducing in the data cartridge 1 loaded in the data cartridge drive 41. This light-emitting indicator 67 is formed with the front end face of a light guide member 68 comprising transparent acrylic resin arranged along a position near the upper edge inside one of the side walls 61b of the chassis 61. On the rear end side of the chassis 61, which is the opposite side of the front panel 42, a circuit board 69 is mounted horizontally across the portion between the upper ends of the pair of right and left side walls 61b and 61c. At one side on the front end of this circuit board 69, a down-facing light-emitting element 70 such as a light-emitting diode is mounted on the back surface. This light-emitting element 70 is arranged on the upper portion at the rear end of the light guide member 68 so that flashing of the element 70 is guided by the light guide member 68 to be indicated at the light-emitting indicator 67.

Figure 13:
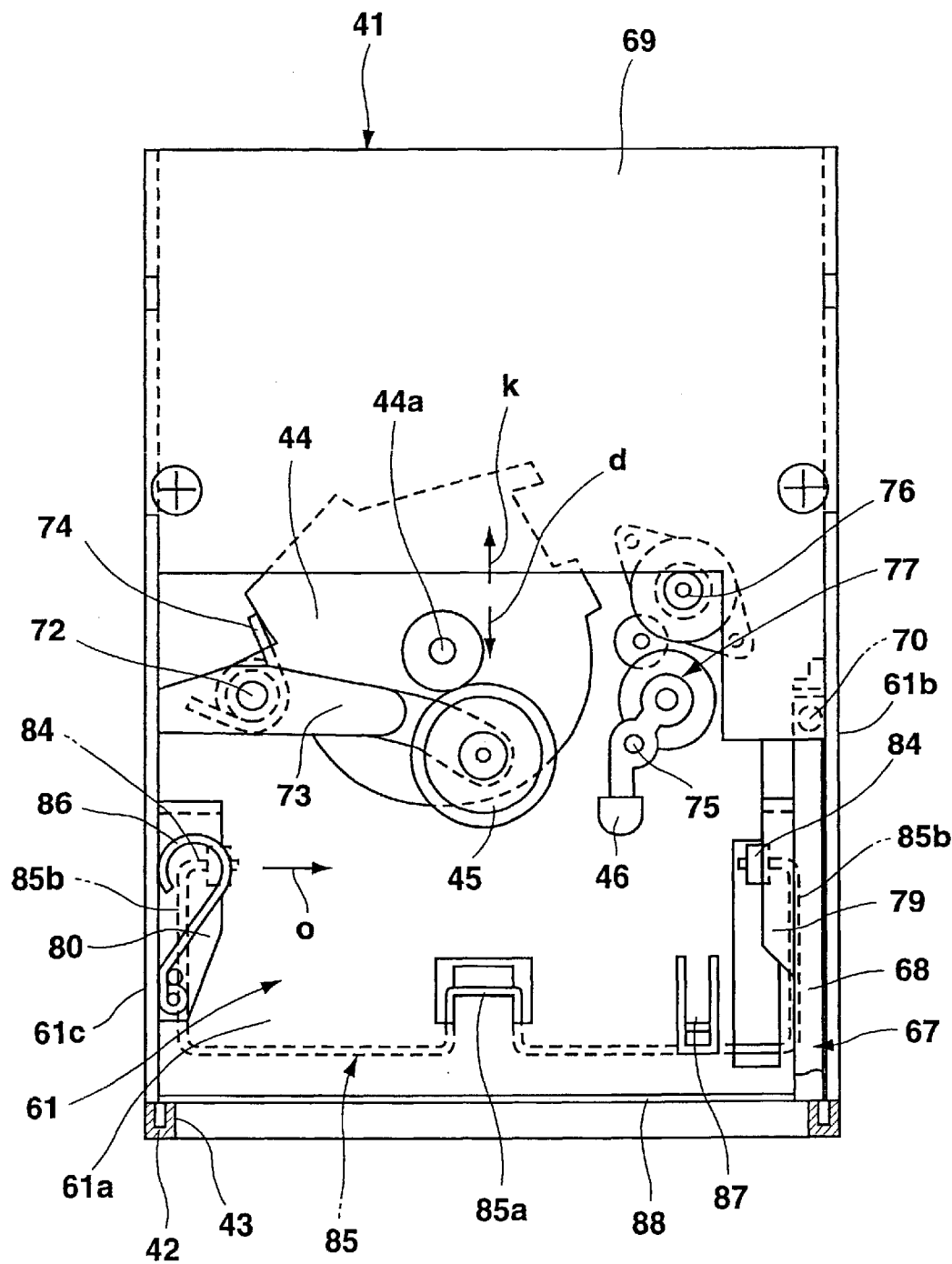
FIG. 13 is a partial cutaway top view showing the data cartridge drive shown in FIG. 12.

The spindle motor 44 is mounted-on the bottom wall 61a of the chassis 61 so as to be rotatable around the vertical shaft 72 in the directions of arrow marks d and k in FIG. 13 within a fixed range, and the capstan roller 45 is also attached on the same bottom wall 61a so as to be rotatable around the same shaft 72 via the support lever 73 in the directions of arrow marks d and k according to the rotation of the spindle motor 44. Thus, both the spindle motor 44 and the capstan roller 45 are rotatably forced in the direction of arrow mark d by the powerful coil spring 74, which is a forcing means attached to the outer periphery of the shaft 72 with the shaft 72 inserted in the coil spring 74, so that the spindle motor 44 and the capstan roller 45 are stopped by stoppers (not illustrated) at their home positions. The magnetic head 46 is attached on the bottom wall 61a of the chassis 61 so as to be moved freely in the vertical direction (up-down direction) along the vertical guide 75. On the bottom wall 61a is attached a vertical feed screw mechanism 77 to be driven by a motor 76 forward and backward. This feed screw mechanism 77 drives the magnetic head 46 upward and downward in fixed pitches along the vertical guide 75.

Inside the pair of right and left side walls 61b and 61c of the chassis 61, is integrally formed a pair of symmetrical cartridge loading guides 79 and 80 horizontally and in parallel to each other. The horizontal under surfaces of this pair of cartridge loading guides 79 and 80 are formed as the vertical reference plane 79a of the data cartridge 1, and the vertical inside surface of one of the cartridge loading guide 79 is formed as the horizontal reference plane 79b of the data cartridge 1 to be loaded. Furthermore, a vertical cartridge loading stoppers 83 is formed under the rear end of the guides 79 and 80 opposite to the front panel 42 together with the pair of cartridge loading guides 79 and 80. The vertical surface of this cartridge loading stopper 83 facing the front panel 42 is formed as the reference plane of the back-and-forth direction of the data cartridge 1.

In the lower portion of the pair of cartridge loading guides 79 and 80 is arranged a pair of right and left metallic cartridge positioning rollers 84, which are at positions offset to the side of the pair of cartridge loading stopper 83. This pair of cartridge positioning rollers 84 are supported by a wire spring 85 comprising a metal wire, which is a forcing means, so as to be movable in the up-down directions of arrow marks m and n and are forced in the upward direction of arrow mark m. In other words, this wire spring 85 is formed like a U-shape as a whole with its center portion 85a fixed near the front panel 42 on the bottom wall 61a of the chassis 61. A pair of right and left arms 85b are extended toward the rear in parallel to each other, and a pair of right and left cartridge positioning rollers 84 are rotatably attached to the rear ends of the pair of arms 85b. This pair of right and left arms 85b can be swung in the upward and downward directions of arrow marks m and n shown in FIG. 6 with their center portion 85a being taken as a rotation fulcrum. To this pair of right and left arms 85b is applied an initial stress in the upward direction of the arrow mark m, by which the pair of right and left positioning rollers 84 are forced in the direction of arrow mark m.

Inside the other side wall 61c of the chassis 61 is attached a plate spring 86, which is a forcing means to move the loaded data cartridge 1 toward the horizontal reference plane 79b in the direction of arrow mark o shown in FIG. 5. At a position near the front panel 42 on the bottom wall 61a of the chassis 61, an elastic arm 87 elastically pressing the loaded data cartridge 1 upward is integrally formed with the bottom wall 61a. At a position near the inner portion of the cartridge loading 43 on the bottom wall 61a of the chassis 61, a horizontally laid height reference projection 88 is integrally formed with the bottom wall 61a in parallel to the front panel 42.

Figure 4:
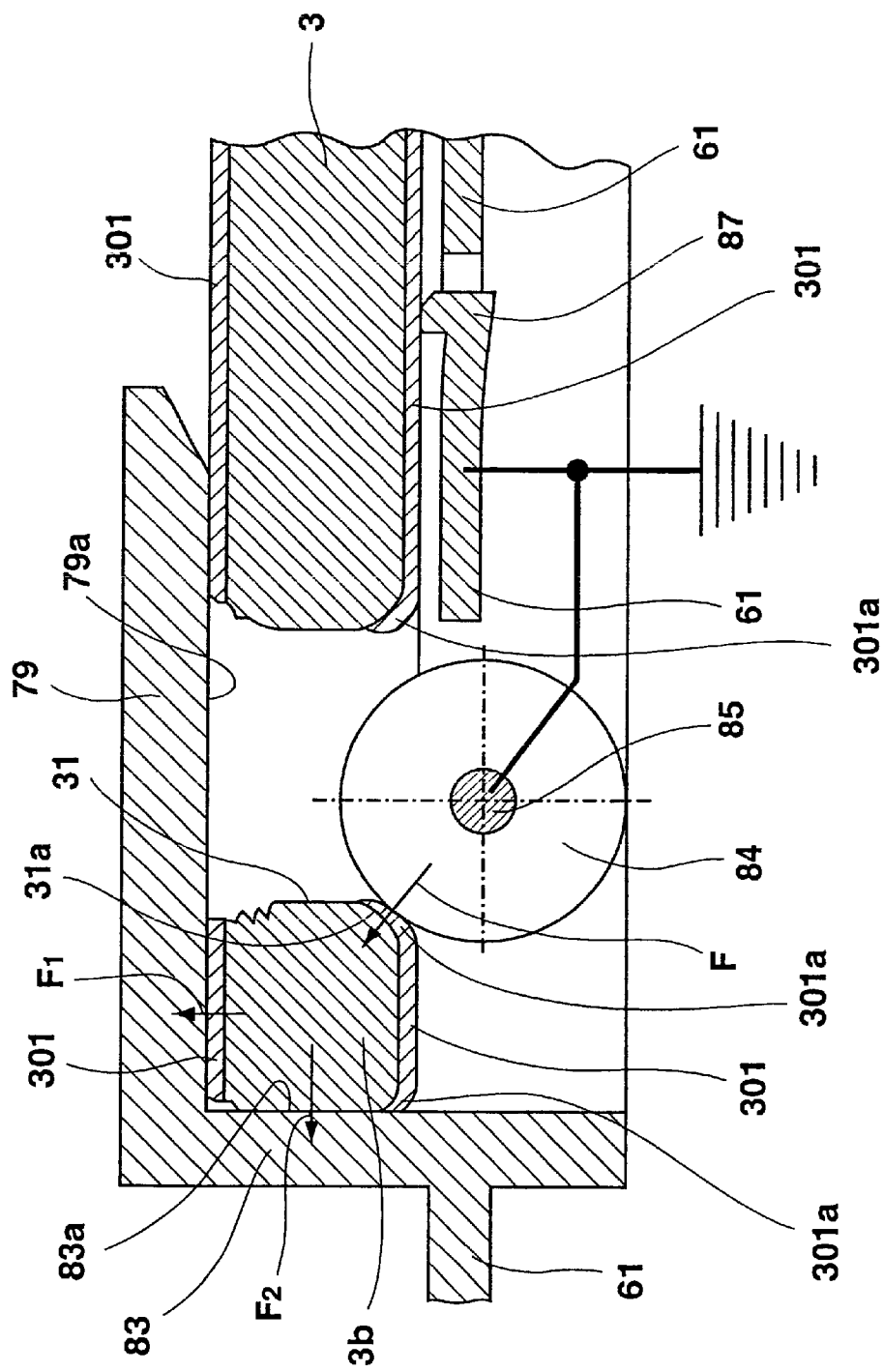
FIG. 4 is a sectional side view explaining positioning of a data cartridge in a data cartridge drive with its base plate, and their grounding for eliminating static electricity.

As shown in FIG. 4 through FIG. 6, the data cartridge drive 41 in the above configuration allows the lid 63 to be pressed open in the direction of arrow mark j against the force of the coil spring when the data cartridge 1 is loaded in the cartridge loading slit 43 from the front end 2a side. At this time, when the lid 63 is opened over a certain angle in the direction of arrow mark j, the lid 63 comes in contact with the plate spring 65. By the repulsive force of the plate spring 65, the lid 63 elastically presses the top surface of the data cartridge 1 in the direction of arrow mark i. Thus, the base plate of the data cartridge 1 is pressed elastically and held horizontally on the height reference projection 88 of the chassis 61, so that the data cartridge 1 is loaded in the cartridge loading slit 43 in the direction of arrow mark c. After this, the pair of right and left cartridge loading guides 79 and 80 are inserted relatively into the pair of right and left wide grooves 30 of the data cartridge 1 loaded in the direction of arrow mark d. In the initial stage of loading of this data cartridge 1 in the direction of arrow mark c, the lid 24 of the data cartridge 1 is opened in an instant against the force of the coil spring around the shaft 25 in the direction of arrow mark a to open the magnetic head recess 12.

With this loading of the data cartridge 1 in the direction of arrow mark c, the base plate 3 of the data cartridge 1 comes onto the elastic arm 87 on the bottom wall 61a of the chassis 61, and the both right and left ends 3a of the base plate 3 are pressed by the elastic arm 87 elastically against the vertical reference plane 79a of the pair of right and left cartridge loading guides 79 and 80 from bottom so that the data cartridge 1 is loaded in the direction of arrow mark c. When the loading of this data cartridge 1 is ended in the direction of arrow mark c, the front edges 3b of the both right and left ends 3a of the base plate 3 come in contact with the pair of right and left cartridge loading stoppers 83, so that the data cartridge 1 stops and both right and left ends 3a of the base plate 3 come onto the pair of right and left cartridge positioning rollers 84. At this time, the positioning rollers 84 go down once in the direction of arrow mark n against the force of the wire spring 85, then they are pushed up by the wire spring 85 in the direction of arrow mark m to be engaged with the pair of notches 31 of the base plate 3 in the direction of arrow mark m. This pair of rollers 84 strongly presses the lower edges 31a of the front edges of the pair of notches 31 in the direction of arrow mark F.

Consequently, the data cartridge 1 is positioned by being pressed against the back-and-forth direction reference plane 83a of the pair of right and left cartridge loading stoppers 83 with the front edges 3b of the right and left ends 3a in the direction of arrow mark F2, as well as being pressed against the vertical reference plane 79a of the pair of right and left cartridge loading guides 79 and 80. On the other hand, just before the loading of this data cartridge 1 in the direction of arrow mark c is ended, the plate spring 86 is inserted relatively into the other wide groove 30 of the data cartridge 1 in the direction of arrow mark d. This plate spring presses the data cartridge 1 in the direction of arrow mark o so that the data cartridge 1 is pressed against the horizontal reference plane 79b of the cartridge loading guide 79 to be positioned.

When the loading of this data cartridge 1 in the direction of arrow mark c is ended, the magnetic head 46 is inserted relatively into the magnetic head recess 12 in the direction of arrow mark d and comes in contact with the magnetic tape 21, and the driving roller 13 of the data cartridge 1 is pressed against the capstan roller 45 in the direction of arrow mark c. At this time, the capstan roller 45 is pressed against the spindle 44a of the spindle motor 44 in the direction of arrow mark c, so that the spindle motor 44 is rotated around the vertical shaft 72 in the direction of arrow mark k against the force of the strong coil spring 74. By the repulsive force of the strong coil spring 74 working in the direction of arrow mark d, the capstan roller 45 is pressed against the driving roller 13 in the direction of arrow mark d.

As mentioned above, the spindle motor 44 drives the driving roller 13 to rotate via the capstan roller 45, and the driving belt 22 feeds the magnetic tape 21, so that the magnetic head 46 can record and reproduce data. The light-emitting indicator 67 flashes to indicate that the data cartridge 1 is in operation for recording or reproducing data. When the data is recorded on and reproduced from the data cartridge 1, the magnetic head 46 is vertically driven pitch by pitch by the vertical feed screw mechanism 77 rotated forward and backward by the motor 76, so that the channel traced by the magnetic head 46 is changed sequentially. As shown with a solid line in FIG. 5, a large capacity data cartridge 1 is used with the side of the front end 2a inserted in the data cartridge drive 41, and with most of the rear side 2b still protruded from the front panel 42. However, the data cartridge 1 is positioned stably in the horizontal direction in the data cartridge drive 41 by the positioning rollers 84, the elastic arms 87, and the height reference projection 88. On the other hand, as shown with an alternate short and long dash line in FIG. 5, when a standard data cartridge 100, which is smaller than the large capacity data cartridge 1 in both right to left width and front to rear depth, is used, its rear end 100b is protruded only slightly from the front panel 42.

On one side in the data cartridge drive 41 is incorporated a sliding type lid opening and closing mechanism used to open and close the lid 24 provided for any of the large capacity data cartridge 1 and the standard data cartridge 100. Hereunder, this sliding type lid opening and closing mechanism will be described with reference to FIG. 7 through FIG. 11. In other words, sliding guides 56, which are members for opening and closing the lid 24, are horizontally arranged above the cartridge loading guide 79 in parallel thereto, and these sliding guides 56 are attached above the cartridge loading guide 79 so as to be freely slidable horizontally in both directions for loading (direction of arrow mark c) and ejecting (direction of arrow mark d) the data cartridge 1.

In this embodiment, this sliding guide 56 is one-piece molded using synthetic resin such as polyacetal resin, fluororesin, and the like having lubricity. The sliding guide is integrally molded with the sliding part 56a having almost H-shaped vertical cross section. With the slide part 56a, the sliding guide 56 is slidably fitted between a pair of upper and lower slide rails 57 integrally formed on one side wall 61b of the chassis. This sliding guide 56 is slid forcibly by a tension spring 58, which is a forcing means provided between the sliding guide 56 and the chassis 61, in the ejecting direction (direction of arrow mark d) coming in contact with the stopper 59 provided at the front edge of the slide rail 57 to be stooped. The force of the tension spring 58 for sliding the sliding guide 56 in the direction of arrow mark d is set larger than the force of the coil spring of the lid 24 of the data cartridge 1 in the direction of arrow mark b.

Figure 7:
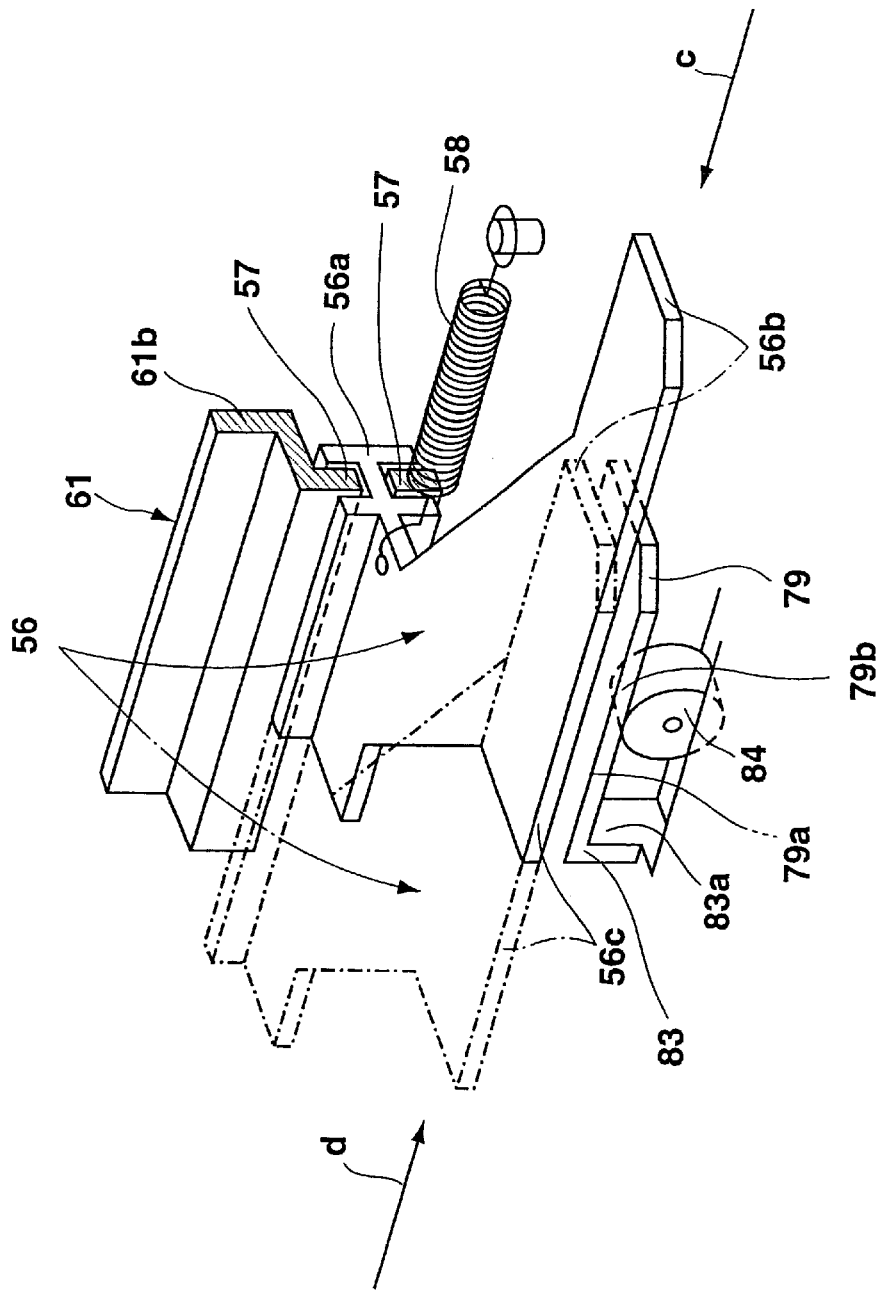
FIG. 7 is a perspective view explaining the sliding type lid opening/closing mechanism in a data cartridge drive.

According to this sliding type lid opening and closing mechanism, when a large capacity data cartridge 1 is loaded in the cartridge loading slit 43 in the direction of arrow mark c, the free edge 24a of the lid 24 comes in contact with the front edge of the sliding guide 56 in the direction of arrow mark c as shown in FIG. 7 in the initial stage of the loading, and then it comes onto the inside surface 56c, so that the lid 24 is opened in an instant in the direction of arrow mark a around the shaft 25 against the force of the coil spring 26. Thus, the lid 24 can be opened completely in safe without being disturbed by the magnetic head 46.

Figure 9:
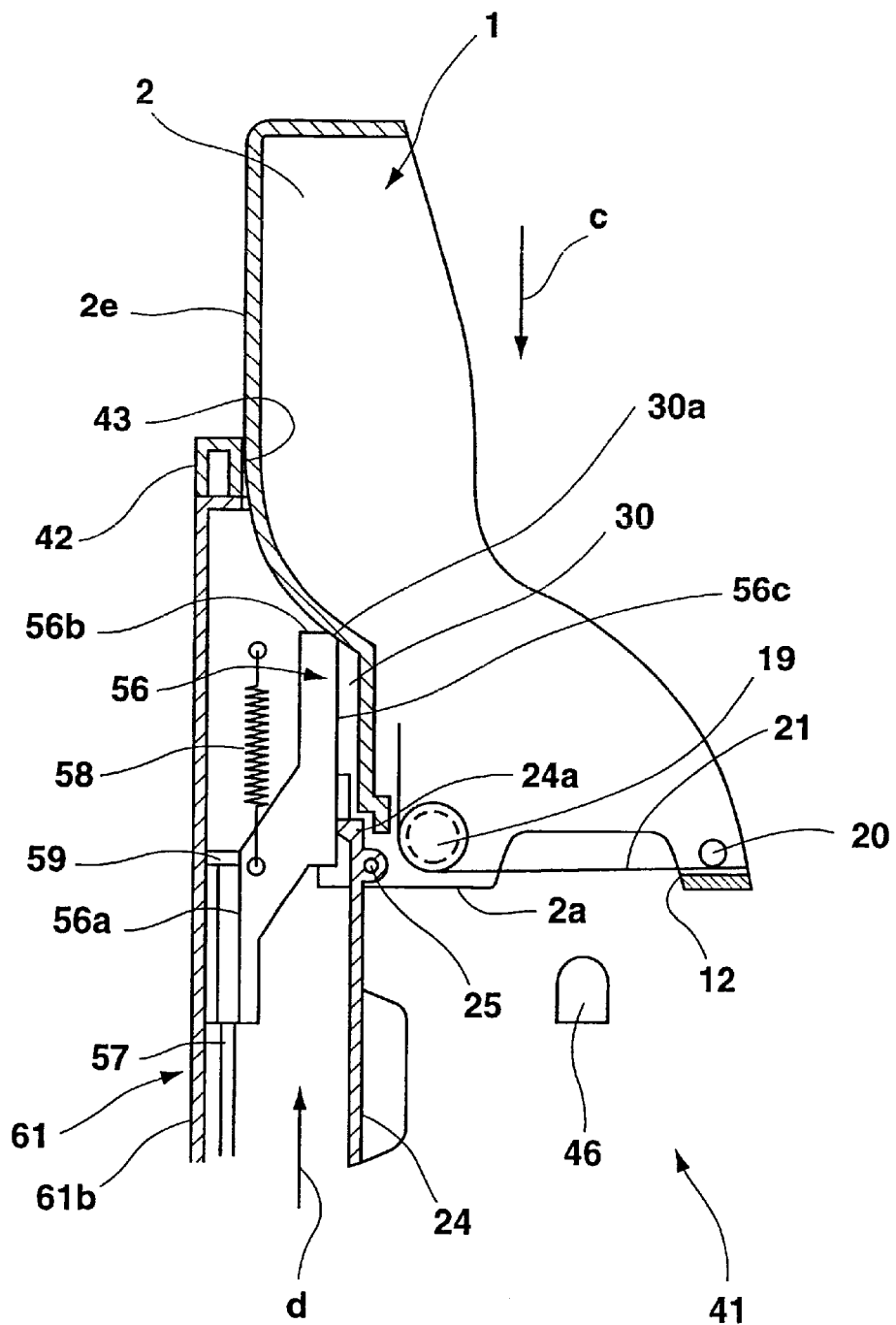
FIG. 9 is a partial cutaway top view showing the state of the sliding type lid opening/closing mechanism shown in FIG. 7 during operation.
Figure 10:
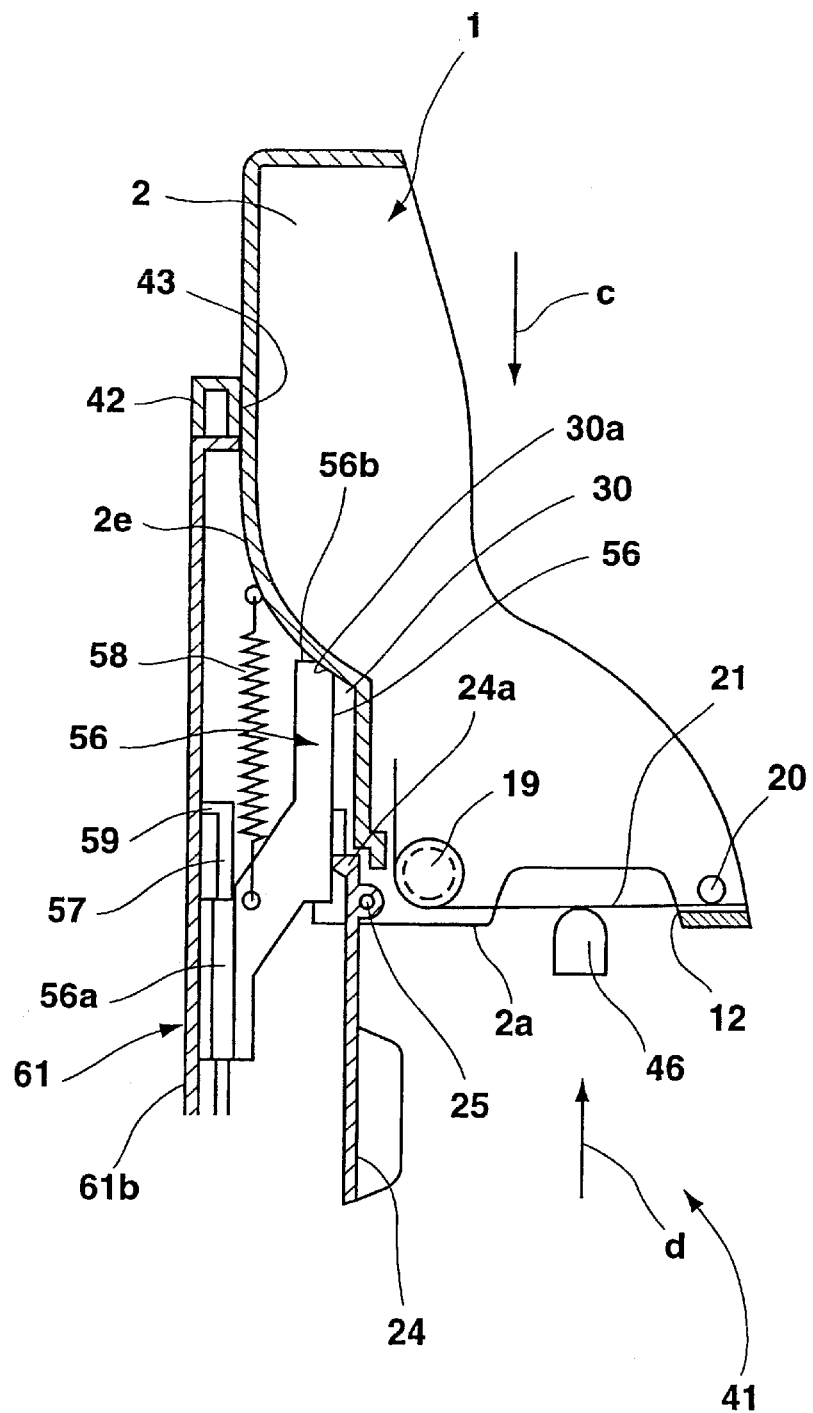
FIG. 10 is a partial cutaway top view showing the state of the sliding type lid opening/closing mechanism shown in FIG. 7 at the end of operation.
Figure 11:
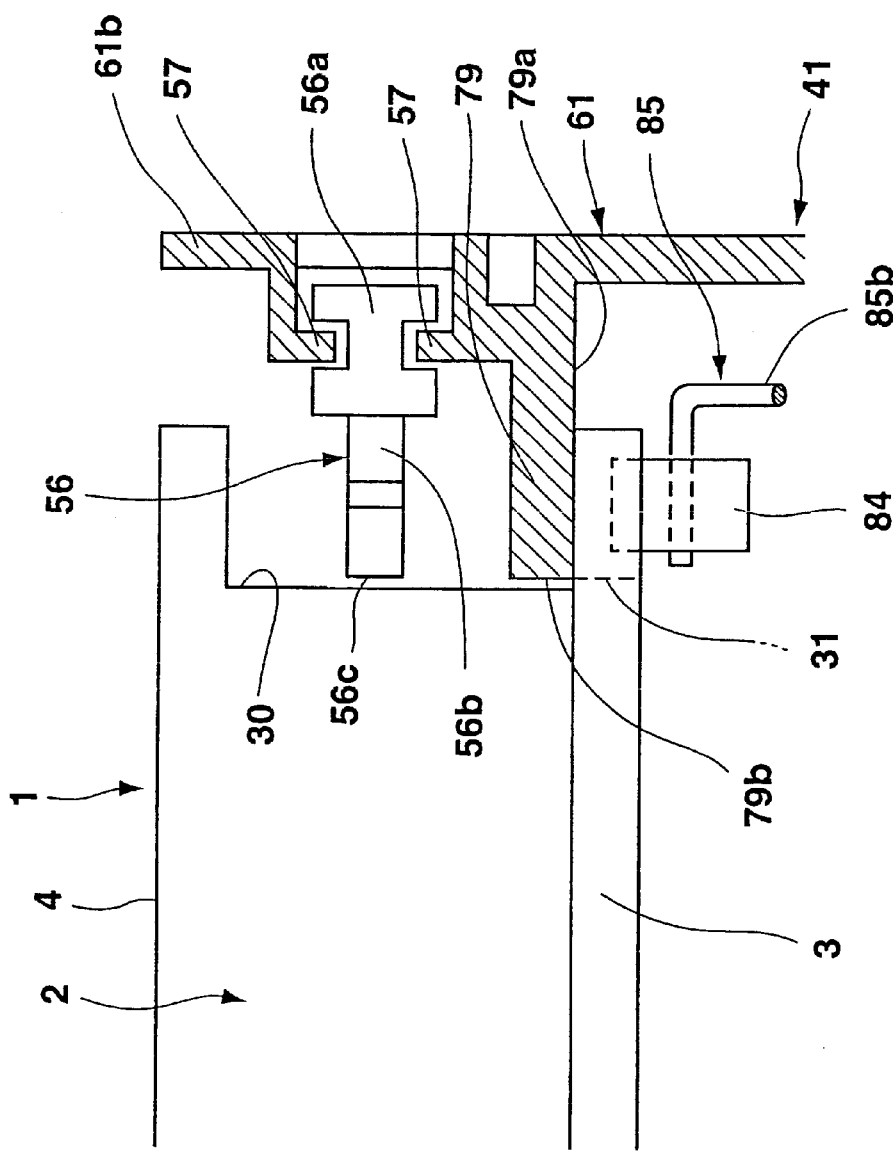
FIG. 11 is a sectional front view of the main portion of the sliding type lid opening/closing mechanism shown in FIG. 10.
Figure 12:
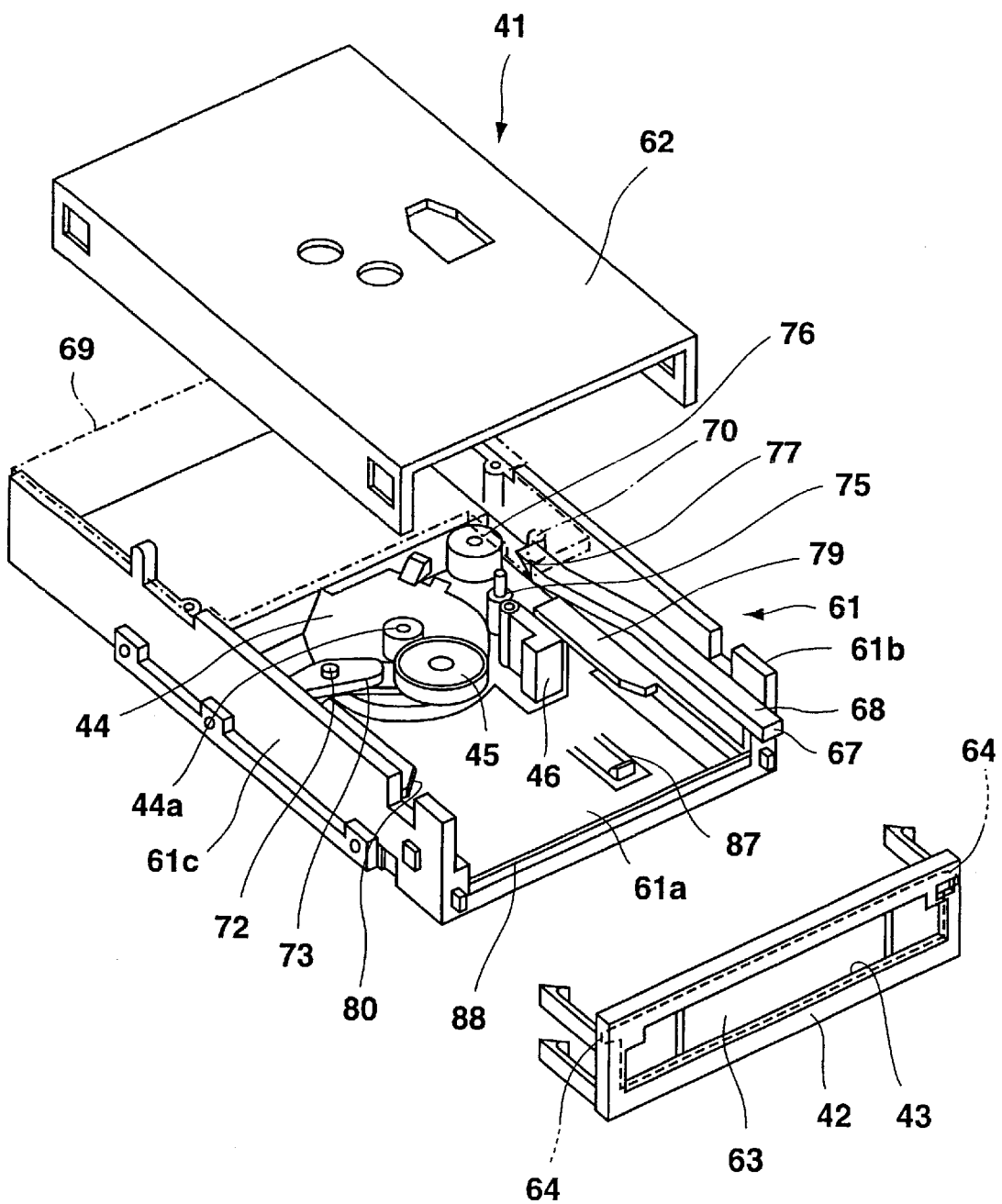
FIG. 12 is a partially exploded perspective view showing a data cartridge drive.

Furthermore, as shown in FIG. 9, as the data cartridge 1 is loaded more deeply in the direction of arrow mark c, the sliding guide 56 is inserted in one of the wide grooves 30 of the data cartridge 1 in the direction of arrow mark c, then the rear end 30a of the wide groove 30 comes in contact with the front edge 56b of the sliding guide 56 in the direction of arrow mark c. After this, as shown in FIG. 10, the sliding guide 56, pressed by the rear end of one of the wide grooves 30 of the data cartridge 1 in the direction of arrow mark c, is slid against the force of the tension spring 58 along the slide rails 57 in the direction of arrow mark c. Then, as shown in FIG. 10, when loading of the data cartridge 1 in the direction of arrow mark c is ended, the lid 24 is inserted on one side of the magnetic head 46 in the direction of arrow mark c and the magnetic head 24 is inserted relatively in the magnetic head recess 12 in the direction of arrow mark d to come in contact with the magnetic tape 21. Then, when ejecting the data cartridge 1 from the cartridge loading slit 43 in the direction of arrow mark d, the sliding guide 56 is slid by the tension spring 58 in the direction of arrow mark d so as to come in contact with the stopper 59 and is stopped.

Figure 8:
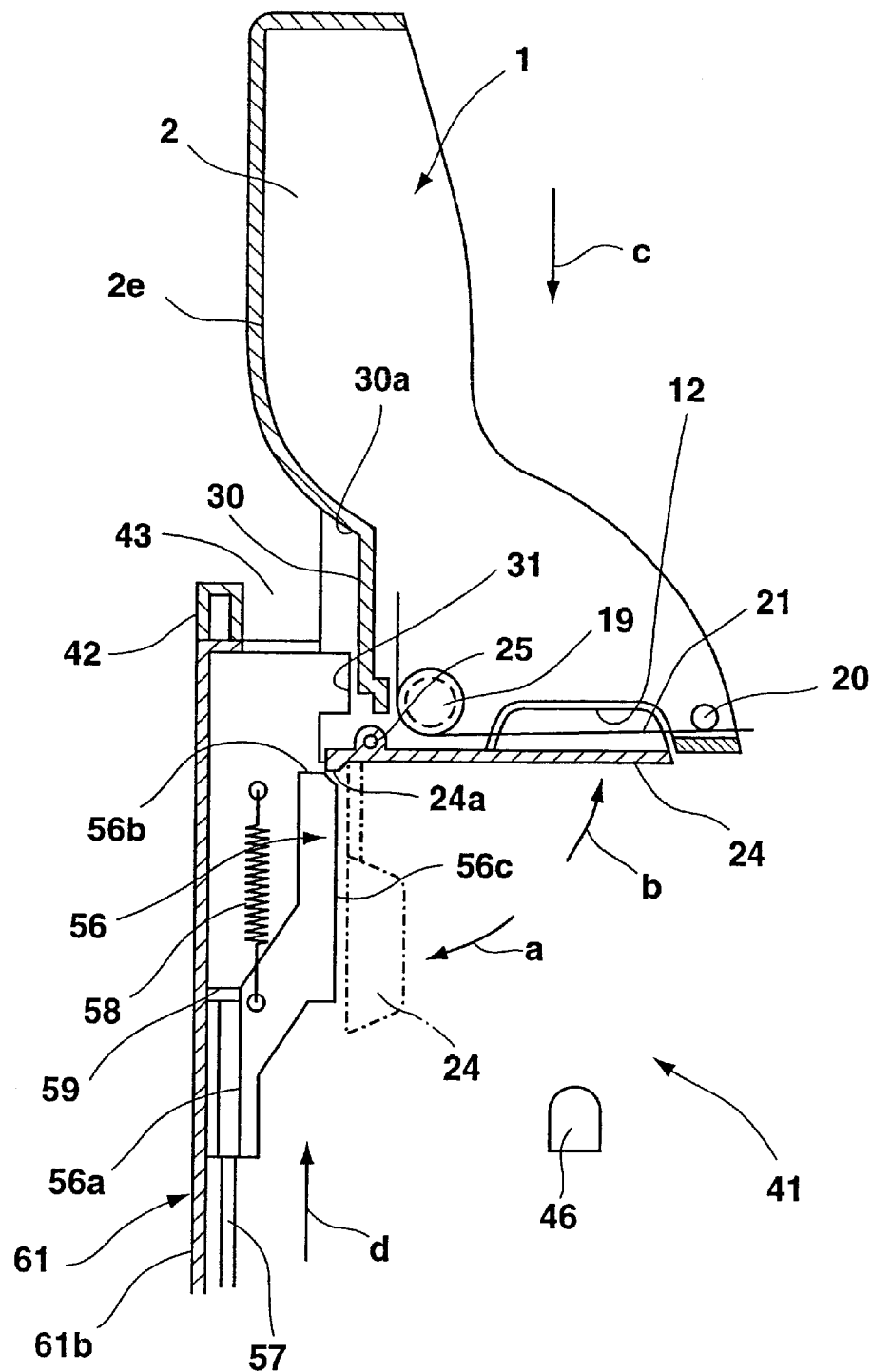
FIG. 8 is a partial cutaway top view showing the state of the sliding type lid opening/closing mechanism shown in FIG. 7 before starting of operation.

When loading a standard data cartridge 100, as shown in FIG. 8, the sliding guide 56 is held as is in the position where it is pressed against the stopper 59 in the direction of arrow mark d by the tension spring 58, and this sliding guide 56 pushes the free edge 24a of the lid 24 relatively in the direction of arrow mark d to open the lid 24 in an instant in the direction of arrow mark a. Consequently, the lid 24 of any of the large data cartridge 1 and the standard data cartridge 100 can be opened smoothly by the sliding guide 56 regardless of the length of the pair of cartridge loading guides 79 and 80. Furthermore, the lid 24 can always be opened safely without being disturbed by the magnetic head 46 at this time. Since the sliding guide 56 is one-piece molded with synthetic resin having lubricity, such as polyacetal, fluororesin, and the like, this sliding guide 56 can be slid smoothly along the slide rail 57 in both directions of arrow marks c and d, so that the load for loading the data cartridge 1 or 100 can be reduced and the loading action can be made easier without supplying any lubricants such as grease, etc. so as to improve productivity.

Subsequently, a method of grounding the data cartridge 1 loaded in the data cartridge drive 41 to eliminate static electricity generated while recording data on and reproducing data from the magnetic tape 21 in a computer will be described with reference to FIG. 2 through FIG. 4. In other words, while data is recorded or reproduced, the spindle motor 44 drives the capstan roller 45, and the capstan roller 45 rotates the driving roller 13 so that the driving belt 22 is driven between the driving roller 13 and the corner rollers 14. Thus, the driving belt 22 feeds the magnetic tape 21 between tape reels 17. And static electricity is generated between capstan roller 45 and driving roller 13, between driving belt 22 and driving roller 13 and corner rollers 14, between driving belt 22 and magnetic tape 21, between magnetic tape 21 and tape reels 17, and between tape guides 19 and 20 during such operations. However, this static electricity is conducted to the conductive film 301 formed on the upper surface of the base plate 3 through the shafts 15, 18, the tapes guides 19 and 20 and is further conducted to the conductive film 301 on the lower surface of the base plate 3 through the base plate 3.

On the other hand, the conductive film 301 on the lower surface of the base plate 3 of the data cartridge 1 loaded in the data cartridge drive 41 is in contact with such grounding means as the cartridge positioning roller 84, the elastic arm 87, and the height reference projection 88 at various positions. Furthermore, the conductive film 301 on the upper surface of the base plate 3 is also in contact with such grounding means as the cartridge loading guides 79 and 80. Consequently, the static electricity conducted to the conductive film 301 on both upper and lower surface of the base plate 3 is further conducted to the grounded metallic chassis 61 through the cartridge positioning roller 84 and the wire spring 85, as well as the height reference projection 88 or the cartridge loading guides 79 and 80. As shown in FIG. 4, when any shear drop 301a of the conductive film 301 wraps around the lower edge 31a of notch 31 of the base plate 3 against which the cartridge positioning roller 84 is pressed in the direction of arrow mark F, the grounding for eliminating static electricity is made more surely by the roller 84.

Since any position on the base plate 3 can be grounded this way, the static electricity generated in the data cartridge 1 can be conducted to the grounded chassis 61 of the data cartridge drive 41 easily and surely through the base plate 3. Thus static electricity is prevented from being accumulated on the driving roller 13, corner rollers 14, tape reels 17, magnetic tape 21, shafts 15, 18, and 25, and tape guides 19 and 20. Consequently, such troubles as data write errors and data damages caused by accumulated static electricity can also be prevented to improve the characteristics and reliability of recording and reproducing data significantly. Furthermore, since static electricity is not accumulated in the data cartridge 1, the circuits provided in the data cartridge drive 41 can also be prevented from harmful influences of static electricity, so that it is no need to shield neither of the spindle motor 44 nor the circuit board 69 using shielding plates. Thus, the invention can realize significant reduction in size, weight, and manufacturing cost of the data cartridge drive 41.

The embodiments according to the present invention are as described above, but the invention also allows variations of those embodiments on the basis of the technical spirit of the invention.

The data cartridge and data cartridge drive in such configuration as explained above according to the present invention exhibit the following effects.

The data cartridge is provided with the base plate whose surface is coated with the conductive film which can prevent the base plate from corrosion. Furthermore, the conductive film enables grounding from any position on the surfaces of the base plate. In addition, the data cartridge drive makes its grounding means in contact with the surface of the base plate only by loading the data cartridge in the data cartridge drive so that the base plate can be in contact with the chassis through which the base plate can be very easily and surely grounded. Thus, the static electricity generated in the data cartridge can be conducted from the base plate to the grounded chassis through the grounding means very easily and surely while data is being recorded on or reproduced from the data cartridge loaded in the data cartridge drive, so that accumulating of static electricity in the data cartridge can be prevented. Consequently, such troubles as data write errors and data damages to be caused by discharging of accumulated static electricity can be prevented to significantly improve the characteristics and reliability for recording and reproducing data. Furthermore, since harmful influences of static electricity on the circuits of the data cartridge drive can be prevented, there is no need to shield the spindle motor and circuits with shielding plates, so that the data cartridge drive can be reduced significantly in size, weight, and manufacturing cost.

The surface of the base plate of the data cartridge can be easily coated with a conductive film by chromate treating the surface of the base plate.

Since the base plate of the data cartridge is die-punched after the surfaces of the base plate is coated with a conductive film, the accuracy for fixing the shafts and the tape guides vertically to be press-fitted on the base plate can be improved.

Since the grounding means of the data cartridge drive in contact with the base plate of the loaded data cartridge are formed with the height reference projection, cartridge loading guides, elastic arms, and cartridge positioning rollers which are provided on the chassis, the structure can be prevented from becoming complicated and increasing the manufacturing cost due to preparation of special grounding means.

What is claimed is:

1. An improved tape cartridge having a metallic base plate;

a magnetic tape loaded in said cartridge; and a feeding mechanism mounted on said base plate for feeding said magnetic tape across a magnetic head to record and reproduce data, the improvement comprising:

an electrically conductive film coating each surface of said metallic base plate, wherein said metallic base plate is made of aluminum and said electrically conductive film on each surface of said metallic base plate is formed by chromate treatment.

2. The data cartridge as defined in claim 1, wherein said metallic base plate is die-punched after having been coated with said electrically conductive film.

3. The data cartridge as defined in claim 1, further comprising:

a plurality of tape guides electrically connected to said electrically conductive film.

4. The data cartridge as defined in claim 3, wherein said plurality of tape guides are press-fitted on said base plate.

* * * * *